United States Patent
Petricoin, Jr.

(10) Patent No.: US 8,964,037 B2
(45) Date of Patent: Feb. 24, 2015

(54) LUGGAGE SECURITY DEVICE

(75) Inventor: Dennis M. Petricoin, Jr., Hemlock, NY (US)

(73) Assignee: Robert Bosch GmbH, Stuttgart (DE)

( * ) Notice: Subject to any disclaimer, the term of this patent is extended or adjusted under 35 U.S.C. 154(b) by 450 days.

(21) Appl. No.: 13/223,921

(22) Filed: Sep. 1, 2011

(65) Prior Publication Data
US 2013/0057694 A1    Mar. 7, 2013

(51) Int. Cl.
H04N 7/18     (2006.01)
H04N 5/225    (2006.01)
H04N 5/232    (2006.01)
G08B 13/196   (2006.01)

(52) U.S. Cl.
CPC .............. *H04N 7/18* (2013.01); *H04N 5/225* (2013.01); *H04N 5/23241* (2013.01); *G08B 13/19619* (2013.01); *G08B 13/19695* (2013.01)
USPC ..... 348/155; 348/143; 348/E7.085; 340/568.7

(58) Field of Classification Search
None
See application file for complete search history.

(56) References Cited

U.S. PATENT DOCUMENTS

| | | | |
|---|---|---|---|
| 6,504,481 B2 | 1/2003 | Teller | |
| 7,848,637 B1 | 12/2010 | Liew | |
| 2002/0057915 A1* | 5/2002 | Mann | 396/661 |
| 2005/0057649 A1 | 3/2005 | Marks | |
| 2006/0237427 A1 | 10/2006 | Logan | |
| 2007/0076095 A1* | 4/2007 | Tomaszewski | 348/155 |
| 2008/0122928 A1 | 5/2008 | Hutton et al. | |
| 2009/0072988 A1* | 3/2009 | Haywood | 340/686.6 |
| 2012/0186926 A1* | 7/2012 | Sheikh | 190/115 |

* cited by examiner

*Primary Examiner* — Christopher S Kelley
*Assistant Examiner* — Kaitlin A Retallick
(74) *Attorney, Agent, or Firm* — Michael Best & Friedrich LLP

(57) ABSTRACT

A battery-powered camera is mounted within the interior of a suitcase. The camera has an awake mode in which the camera captures a plurality of images in response to it being detected that the suitcase is in an open position. A controller switches the camera from a sleep mode to the awake mode in response to the user actuating an awake mode switch, a motion detector mounted to the suitcase detecting motion of the suitcase, and/or a touch sensor mounted to the suitcase detecting a human being touching the suitcase.

10 Claims, 5 Drawing Sheets

LUGGAGE SECURITY DEVICE

BACKGROUND OF THE INVENTION

1. Field of the Invention

The present invention relates to surveillance cameras, and, more particularly, to surveillance cameras that are placed on personal property.

2. Description of the Related Art

Given today's higher level of security when traveling, people often find that their luggage needs to be unlocked when it is checked-in at various transportation ports (airports, for example). This luggage is then searched by unknown parties for security purposes. Valuable items may also be stolen.

A problem is that the personnel who open and inspect luggage have been known to occasionally steal some of the valuable contents of the luggage that they inspect. Because these inspectors inspect the luggage in private rooms, the inspectors may easily steal valuables without anyone noticing until the luggage owner opens his luggage several hours later and in a different city. At this point, accusations of thievery on the part of luggage inspectors are difficult to make, and recovering the stolen valuables is even more difficult.

Another problem is that when a person is carrying a valuable or sensitive personal container in public, which could be as small as a briefcase, jewelry box, or even a wallet, he may be unaware when the container is not as close to him as he would like it to be. This distance between the owner and the container may be due to the owner forgetting or misplacing the container, or the container being stolen by someone else. The owner may not become aware that the container is missing until it is too late for the owner to recover the container.

What is neither disclosed nor suggested by the prior art is a way to detect and prove that contents of luggage have been stolen or inappropriately tampered with. What is also neither disclosed nor suggested by the prior art is a way to detect, prove and inform the owner that his personal container is no longer within his possession or control.

SUMMARY OF THE INVENTION

The present invention is directed to a suitcase with a small surveillance camera and microphone mounted to the distal portion of the inner surface of the lid. The camera has a very wide angle lens and is well hidden behind the lining or is built into the frame of the luggage. The camera and microphone may be activated by a visible light sensor, and/or a tilt sensor. Thus, when the lid is opened, the camera and microphone are activated and begin collecting audio and video data. The collected audio and video data may be recorded within the device or wirelessly transmitted to a remote storage location for recording. The surveillance camera and microphone may be used to monitor the actions of airport luggage inspectors, for example, and to detect theft on their part. When the lid is closed, the electronics within the luggage is turned off to conserve battery power and to avoid detection by, or interference with, electronic luggage scanning equipment used by the airport luggage inspectors.

In one embodiment, in order to conserve battery power, the camera may remain in a sleep mode (in which, e.g., the camera does not monitor the presence of light) unless there is some indication that the luggage is likely to be searched in the immediate future (e.g., within the next few minutes). The indication that the luggage is likely to be searched may include detecting that the user has actuated a hidden switch on the luggage. The switch may be on the inside or the outside of the luggage. Another indication that the luggage is likely to be searched may include sensing recent movement of the luggage, such as with a strain gauge. Yet another indication that the luggage is likely to be searched may include sensing that someone has recently touched the luggage, such as via the use of capacitive charge sensing.

In another embodiment, also in order to conserve battery power and to reduce memory requirements for storing video, the camera does not capture video in response to light if the nearby presence of the luggage owner is confirmed or sensed. The presence of the luggage owner may be confirmed such as by sensing (e.g., receiving a radio frequency signal from) a transponder that the owner carries. The transponder may be a keyfob or identification card, for example. The transponder may alternatively be mounted in the luggage and may respond to RF signals from the user's personal electronics device. The presence of the luggage owner may also be confirmed via facial recognition by a camera of the system when the luggage is opened. In another embodiment, the presence of the luggage owner may also be confirmed by at least one of the cameras recognizing a "password" from the owner in the form of a predetermined hand gesture, or by a microphone detecting a spoken password or phrase uttered by the owner.

In yet another embodiment, two separate cameras may be provided on the luggage such that the two cameras are on opposite ends of the luggage when the luggage is splayed in the open position. Each of the cameras may capture video of the luggage and the space immediately above the luggage. One of the cameras may have a wide angle lens such that the camera may capture any activity within a few feet of the luggage. The other camera may have a field of view that corresponds to the boundaries of the luggage such that the contents of the luggage and the items within the luggage can be individually seen and monitored by use of the captured video.

In still another embodiment, in order to reduce memory requirements, the luggage includes a weight scale integrated in the handle to determine the weight of the contents of the luggage. In the event that the weight of the contents of the luggage is the same after a search of the luggage as it was before the search, the video captured during the search is erased from memory, because the lack of a change in weight indicates that no contents were taken during the search.

In a further embodiment, a wallet (e.g., "billfold") includes a radio frequency (RF) receiver. A human owner of the wallet carries a short-range RF transmitter. In one embodiment, the transmitter is integrated into the owner's cell phone or other personal electronic device. The transmitter periodically (e.g., at twenty second intervals) transmits an RF signal to the receiver. If the transmitter carried by the human owner moves out of transmission range (e.g., fifty feet) of the receiver, such that the receiver no longer receives the RF signals, a camera mounted on an inner surface of the wallet is activated such that the camera records video data in response to sensing light, such as when the wallet is unfolded. The video data is wirelessly transmitted to a remote location for storage. The wallet may also include a short-range RF transmitter, and the owner may carry an RF receiver, which may also be integrated within a cell phone or other personal electronics device. The transmitter in the wallet may also periodically transmit RF signals to the receiver carried by the owner. If the receiver carried by the owner stops receiving the RF signals from the wallet, then the receiver notifies the owner that the wallet is outside of transmission range, such as by buzzing, vibrating, or ringing the cell phone. In addition to a wallet, this embodiment of the invention may also be applied to a briefcase, jewelry box, or other high value or confidential personal container that the owner wants to keep close to him.

In any of the embodiments described herein, the camera may be in the form of a pan, tilt zoom camera that may be concealed within a tinted hemispherical dome. The pan, tilt, zoom movements of the camera may be automatically controlled to follow detected motion in the vicinity. Alternatively, the pan, tilt, zoom movements of the camera may be remotely controlled by the user or other security personnel to follow the actions of a person who is in possession of the suitcase or other personal container.

The invention comprises, in one form thereof, a luggage security system including a suitcase having an open position and a closed position. Detecting means detects that the suitcase is in the open position. A camera is mounted within the interior of the suitcase. The camera is powered by a battery. The camera has an awake mode in which the camera captures a plurality of images in response to the detecting means detecting that the suitcase is in the open position. The camera also has a sleep mode in which the camera does not capture images. The camera consumes less power from the battery in the sleep mode than in the awake mode. A controller is mounted within the interior of the suitcase and is communicatively coupled to the camera. The controller switches the camera from the sleep mode to the awake mode in response to the user actuating an awake mode switch, a motion detector mounted to the suitcase detecting motion of the suitcase, and/or a touch sensor mounted to the suitcase detecting a human being touching the suitcase.

The invention comprises, in another form thereof, a personal container security system including a container having an open position and a closed position. Sensing means senses absence of a human owner of the container within a vicinity of the container. Detecting means detects that the container is in the open position. A camera is mounted to the container. The camera is communicatively coupled to the detecting means. The camera has an awake mode in which the camera captures a plurality of images in response to the detecting means detecting that the container is in the open position, and the sensing means sensing an absence of the human owner of the container within a vicinity of the container. The camera also has a sleep mode in which the camera does not capture images.

The invention comprises, in yet another form thereof, a luggage security system including a suitcase having a first shell portion with a first proximal end and a first distal end, and a second shell portion having a second proximal end and a second distal end. The first proximal end and the second proximal end are attached together by a hinge. The suitcase has an open position in which the distal ends are pivoted about the hinge away from each other, and a closed position in which the distal ends are adjacent to each other. Detecting means detects that the suitcase is in the open position. A first camera is mounted to the first distal end of the suitcase. A second camera is mounted to the second distal end of the suitcase. Each of the first and second cameras is directed generally towards an interior of the suitcase when the suitcase is in the open position. Electrical power means powers the first and second cameras. Each of the first and second cameras has an awake mode in which the camera captures a plurality of images in response to the detecting means detecting the suitcase being in the open position. Each of the first and second cameras also has a sleep mode in which the camera does not capture images. Each of the cameras consumes less power from the electrical power means in the sleep mode than in the awake mode.

The invention comprises, in still another form thereof, a luggage security arrangement including a camera mounted on a suitcase. A memory device is mounted on the suitcase and stores video data captured by the camera. A weight scale is integrated into the suitcase and measures a weight associated with the suitcase. A controller is communicatively coupled to the memory device and to the weight scale. The controller erases the video data stored in the memory device in response to the weight scale indicating that a weight measurement associated with the suitcase is unchanged from a previous weight measurement associated with the suitcase.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
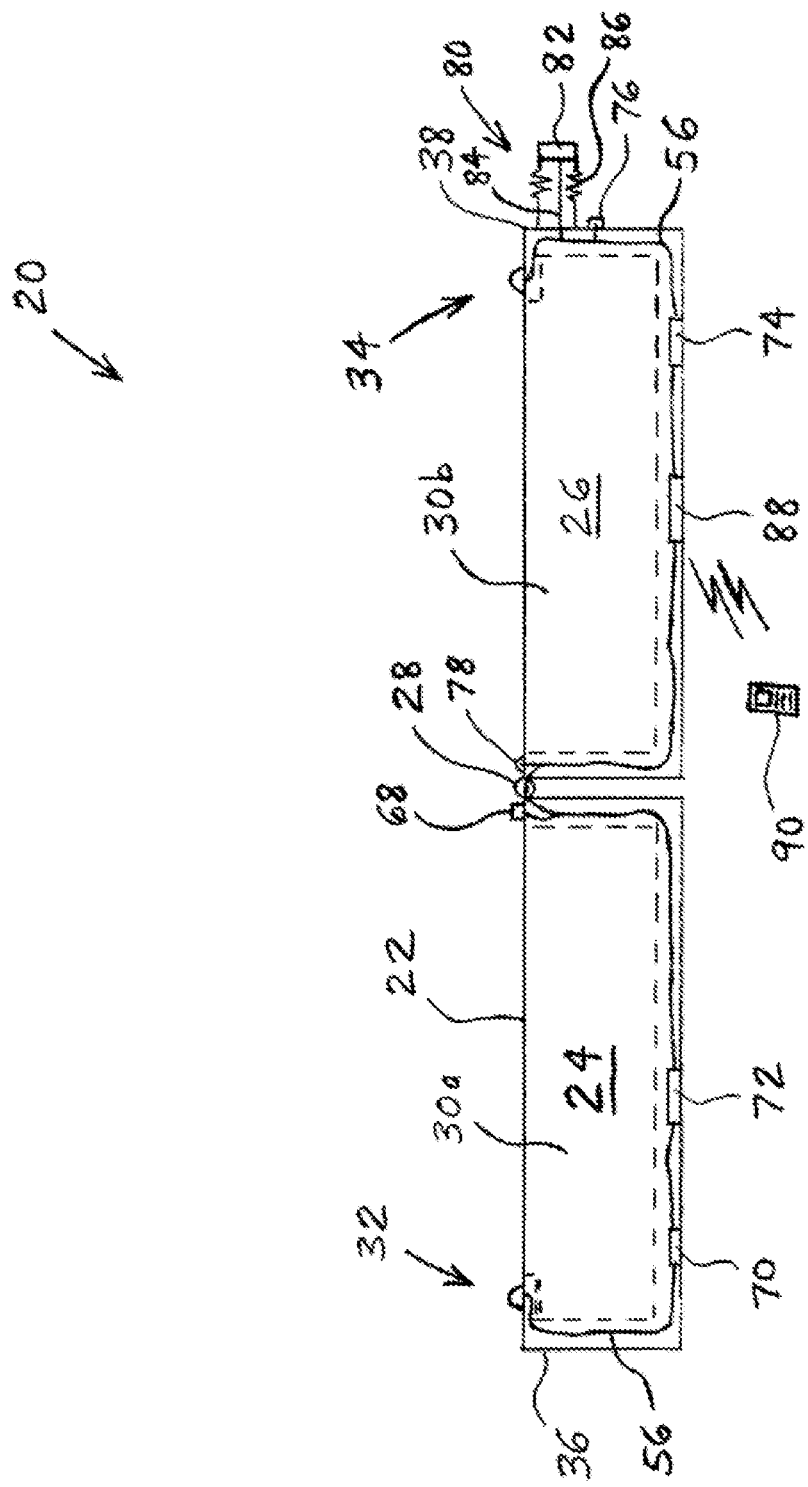
FIG. 1 is a schematic view of one embodiment of a luggage security system of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

In accordance with the present invention, one embodiment of a luggage security system 20 is shown in FIG. 1. System 20 includes a suitcase 22 having two shell halves 24, 26 pivotally coupled to each other via a hinge 28. Suitcase 22 is shown in the open position in which shell halves 24, 26 are splayed to expose an interior compartment including interior space 30*a* of shell half 24 and interior space 30*b* of shell half 26. Shell halves 24, 26 may be pivoted together such that the interior compartment is enclosed by shell halves 24, 26, as is well known.

Figure 2A:
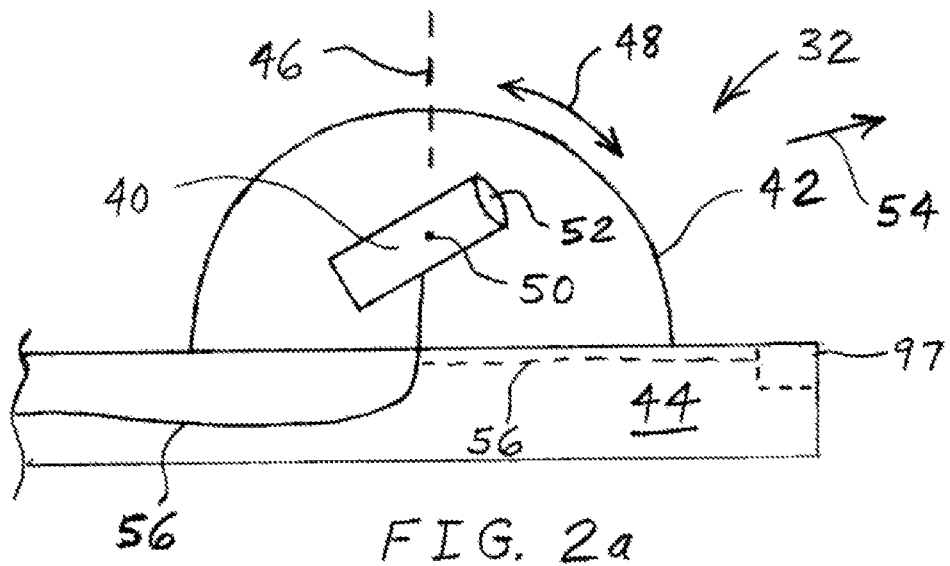
FIG. 2a is an enlarged schematic view of one of the enclosed cameras of the system of FIG. 1.

Each of shell halves 24, 26 has a respective enclosed surveillance camera arrangements 32, 34 mounted on its respective distal end 36, 38. As shown in the enlarged view of FIG. 2*a*, enclosed surveillance camera arrangement 32 includes a pan, tilt, zoom camera 40 disposed within a hemispherical dome enclosure 42 and mounted on a cantilever support 44. Enclosure 42 may be tinted such that camera 40 cannot be seen by the naked eye from outside of enclosure 42. Camera 40 may undergo panning movements about an axis 46, and may undergo tilting movements in directions indicated by double arrow 48 and about axes 50 perpendicular to axis 46. Camera 40 may zoom in and zoom out to reduce and expand its field of view, respectively. As shown in FIG. 2*a*, a lens 52 of camera 40 may be directed in a direction 54 generally towards the interior of suitcase 22 and the space above suitcase 22. Camera 40 may include a local controller (not shown) and one or more motors (not shown) for executing the panning, tilting and zooming movements. An electronic communication bus 56 may carry electrical power and commands to camera 40, and may carry digitized captured image data away from camera 40.

Figure 2B:
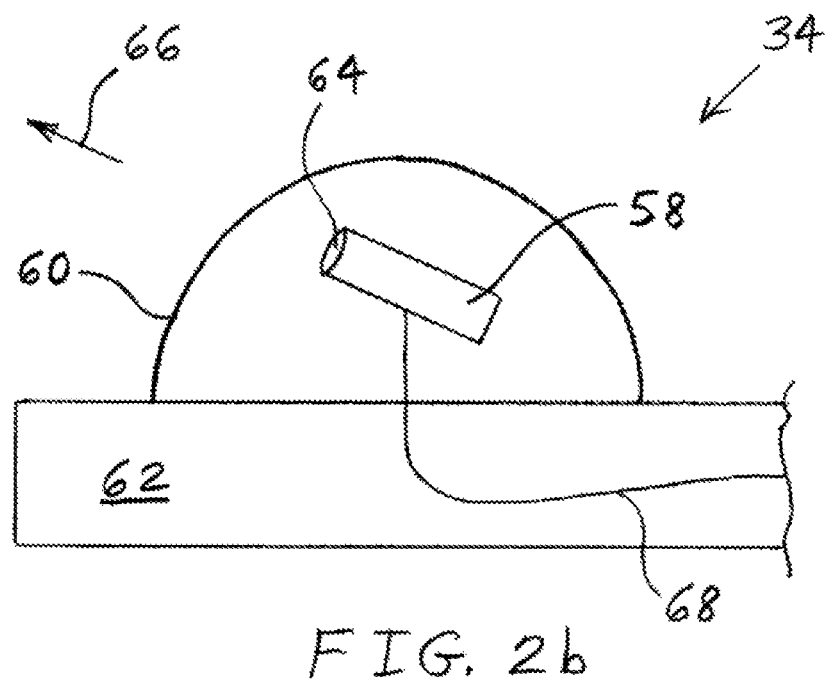
FIG. 2b is an enlarged schematic view of another one of the enclosed cameras of the system of FIG. 1.

As shown in the enlarged view of FIG. 2b, enclosed surveillance camera arrangement 34 includes a fisheye or wide angle lens camera 58 disposed within a hemispherical dome enclosure 60 and mounted on a cantilever support 62. Enclosure 60 may be tinted such that camera 58 cannot be seen by the naked eye from outside of enclosure 60. As shown in FIG. 2b a lens 64 of camera 58 may be directed in a direction 66 generally towards the interior of suitcase 22 and the space above suitcase 22. Because of the wide angle field of view of camera 58, camera 58 may capture images of all of the activity in and around suitcase 22. Electronic communication bus 56 may carry electrical power and commands to camera 58, and may carry digitized captured image data away from camera 58.

Referring again to FIG. 1, system 20 includes an open/closed pushbutton switch sensor 68 mounted on a proximal end of shell half 24 and in electrical communication with bus 56. When suitcase 22 is open as shown in FIG. 1, switch sensor 68 is in the unbiased position. However, when suitcase 22 is closed, shell half 26 abuts against shell half 24, thereby depressing pushbutton switch sensor 68 into shell half 24. Switch sensor 68 may be electrically closed when suitcase 22 is closed, and electrically open when suitcase 22 is open, or vice versa. Thus, switch sensor 68 may sense whether suitcase 22 is in the open position or the closed position.

System 20 further includes other components that are interconnected via communication bus 56, including a battery 70 for powering all of the electrical devices connected to bus 56. A motion detector 72 mounted to suitcase 22 is able to determine whether suitcase 22 has been recently moved from place to place, jostled, or picked up. Motion detector 72 may be, for example, a gyroscope, such as a MEMS gyroscope, or a tilt sensor, such as a rolling-ball type tilt sensor, or a mercury type tilt sensor. Motion detector 72 may also use any other conventional motion detection technology, such as infrared.

In addition, or as an alternative, to motion detector 72, suitcase 22 may include a touch sensor 74 for detecting when a human being touches suitcase 22. In one embodiment, touch sensor 74 may be a capacitive touch sensor that measures a change in capacitance when a human being touches suitcase 22. Because it is nearly certain that suitcase 22 is moved somewhat whenever it is touched, touch sensor 74 may also function to detect motion of suitcase 22.

Figure 3:
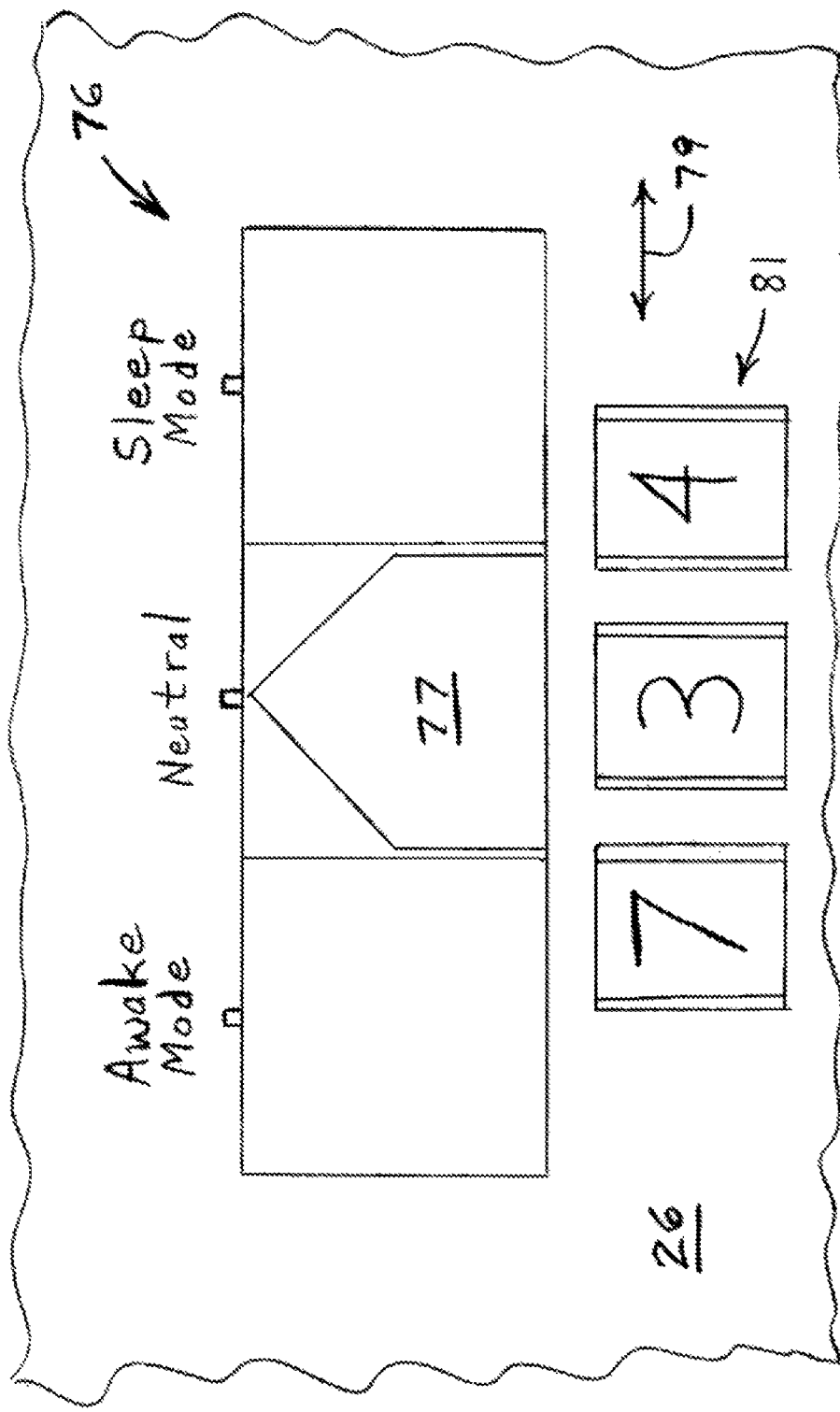
FIG. 3 is a plan view the awake mode switch and associated combination lock of the system of FIG. 1.

Suitcase 22 may include a manually-actuatable awake switch 76 that the user can actuate in order to place cameras 40, 58 and a microphone 78 into an awake mode in which cameras 40, 58 capture video data and microphone 78 captures audio data in response to switch sensor 68 determining that suitcase 22 is in the open position. In one embodiment shown in FIG. 3, switch 76 has three positions, including an awake mode position, a sleep mode position, and a neutral position. A selector 77 is manually slidable in directions indicated by double arrow 79 in order to select one of the three positions. In the awake mode position, system 20 remains in the awake mode so long as switch 76 remains in the awake mode position. Similarly, in the sleep mode position, system 20 remains in the sleep mode so long as switch 76 remains in the sleep mode position. In the neutral position, system 20 may switch to the awake mode from the sleep mode in response to certain predetermined stimuli. For example, the movement of suitcase 22 as sensed by motion detector 72 or weight sensor 82, or a human touching suitcase 22 as sensed by touch sensor 74, may at least temporarily cause system 20 to switch from the sleep mode to the awake mode. In order to prevent switch 76 from being accidentally moved to another position, or intentionally moved to another position by an unauthorized person, switch 76 may be locked in its current position by a key lock or combination lock 81. In order to avoid calling attention to the fact that suitcase 22 includes surveillance equipment, switch 76 and combination lock 81 may be disposed in a recess and covered by a pivotable door (not shown) that is flush with the outer surface of shell half 26 when closed.

In one specific embodiment, system 20 switches to the awake mode for a predetermined time period in response to the sensing of movement of suitcase 22. After the predetermined time period, if no further movement has been sensed, then system 20 reverts back to the sleep mode. This time period may be adjustable, via a dial (not shown) for example, to a length of time in which it is perceived by the user that suitcase 22 will be opened after having been moved. In a specific embodiment, the predetermined time period is sixty seconds, but may range between about ten seconds and about ten minutes, for example.

When in the awake mode, cameras 40, 58 and microphone 78 record video and audio data in response to a determination that suitcase 22 is in the open position. In one embodiment, the release of switch sensor 68 is indicative of suitcase 22 being in the open position. Alternatively, one of cameras 40, 58 may operate as a light detector that determines that suitcase 22 is in the open position when the presence of light is detected. Here again, in response to determining via light detection that suitcase 22 is open, cameras 40, 58 may capture video data and microphone 78 may capture audio data. Microphone 78 is also connected to communication bus 56.

Suitcase 22 may include a handle 80 which has a weight sensor 82 that is mechanically coupled to shell half 26 via a transducer 84. Handle 80 may also be connected to shell half 26 via leather, cloth, or other material that has some slack, as indicated at 86 by accordion-like folds, such that substantially the entire weight of suitcase 22 is borne by transducer 84 when someone picks up suitcase 22 by handle 80. Transducer 84 may have a measurable property or characteristic that predictably changes with the amount of pulling force applied thereto. The measurable property or characteristic may be, for example, resistance or capacitance or any other physical property. In one embodiment, weight sensor 82 is in the form of a strain gauge. Weight sensor 82 may also be electrically connected to bus 56. Weight sensor 82 may also function as a motion detector. For example, each time that sensor 82 senses a non-zero weight, or a change in weight, sensor 82 may thereby determine that suitcase 22 has been moved.

Suitcase 22 may include an electronic controller 88 that is mounted within the interior of suitcase 22, that is electrically connected to bus 56, and that may be in communication with each of the above-described electrical devices via bus 56. Controller 88 may include a microprocessor and memory for storing audio data and/or video data. In one embodiment, controller 88 is able to switch cameras 40, 58 and microphone 78 between an awake mode and a sleep mode. In the awake mode, the cameras and microphone may be "ON" and running such that each camera captures a series of images, and the microphone continuously captures audio data corresponding to the captured images, in response to the determination that the suitcase is in the open position. Sensor switch 68 may perform the detection of suitcase 22 being in the open position. Alternatively, one or both of cameras 40, 58 may sense ambient light while still in the sleep mode to thereby perform the detection of suitcase 22 being in the open position.

In the sleep mode, the cameras do not capture images, and the microphone does not capture audio data. Cameras 40, 58 and microphone 78 may consume less power from battery 70 in the sleep mode than in the awake mode. Accordingly, it may be extend battery life to keep cameras 40, 58 and microphone 78 in the sleep mode unless there is reason to believe that there may be activity around suitcase 22 that the user would be interested in, and thus audio and video recording of such activity is called for.

In one embodiment, controller 88 switches one or both of the cameras from the sleep mode to the awake mode in response to there being an indication of some activity surrounding suitcase 22 that may be recorded in audio and/or video. Such an indication of activity may include the user actuating awake mode switch 76, motion detector 72 detecting motion of suitcase 22, one or both of cameras 40, 58 sensing motion of suitcase 22, weight sensor 82 detecting motion of suitcase 22, and/or touch sensor 74 detecting a human being touching suitcase 22.

In one application, system 20 may be used to record the activities of a luggage screener at an airport who inspects baggage before it is loaded onto an airplane. For example, the user may keep suitcase 22 in a closet at his home with cameras 40, 58 and microphone 78 in a sleep mode such that the current draw from battery 70 is at a low level. When preparing for a trip and packing his belongings into suitcase 22, the user may keep switch 76 in the sleep mode position in order to prevent battery 70 from being run down. Switch 76 may be locked in the sleep mode position with a key-based lock or combination lock 81 in order to prevent switch 76 from being accidentally moved into the neutral or sleep mode position. Soon before the user checks the suitcase and relinquishes possession of it to airport personnel, the user may unlock switch 76, place switch 76 in the awake position, and use lock 81 to lock switch in the awake position.

Alternatively, in embodiments in which the suitcase, such as suitcase 22, is equipped with motion detection means and/or touch sensing means, the user may unlock the switch 76 and place and lock switch 76 in the neutral position just before checking the suitcase. With switch 76 in this neutral position, the sensing of movement of suitcase 22, or the sensing of a human touching suitcase 22, may cause system 20 to at least temporarily switch to the awake mode.

En route to the airplane security personnel may inspect and open suitcase 22 and look through its contents. If suitcase 22 is in the neutral mode and is equipped with motion detecting means or touch sensing means, the detection of motion or the sensing of touching of suitcase 22 may cause system 20 to go into the awake mode for one to several minutes, for example. With system 20 in the awake mode, due to switch 76 being in the awake mode position or due to the detection of motion or touching, the human luggage inspector may open suitcase 22 by pivoting halves 24, 26 away from each other to the splayed position shown in FIG. 1. System 20 may sense that suitcase 22 has been opened, such as by use of switch sensor 68, or by use of camera 40 and/or camera 58 in a light-sensing mode. In response to sensing that suitcase 22 has been opened, cameras 40, 58 may begin to capture video image data, and microphone 78 may begin to capture audio data. This captured video and audio data may be transmitted to controller 88 for storage in memory associated with controller 88.

In one embodiment, upon sensing the opening of suitcase 22, controller 88 transmits a wireless message, such as a text message, to the user's cell phone or other personal electronic device 90. Controller 88 then may transmit the streams of captured video and audio data to the user for displaying and playing on personal electronic device 90. Controller 88 may also be capable of receiving wireless signals such that the user can remotely control the pan, tilt and/or zoom movements of camera 40 to follow the movements of the human luggage inspector as he searches through the contents of suitcase 22. In addition, or alternatively, camera 40 and controller 88 may be capable of automatically identifying and tracking motion produced by the human luggage inspector, and automatically controlling the pan, tilt and/or zoom movements of camera 40 to follow the movements of the human luggage inspector. The user has the option of saving the received audio and video data on device 90, or automatically saving the received audio and video data on device 90 for later viewing without having to watch it live.

In one embodiment, weight sensor 82 measures the weight of suitcase 22 each time a force is exerted on transducer 84. Each measurement may be stored in memory associated with controller 88. In one embodiment, only measurements that are in a range of possible true weight measurements of suitcase 22 and its contents are recorded. For example, if the weight of suitcase when empty is ten pounds, any weight measurements less than ten pounds, which may be due to handle 80 being gripped while suitcase 22 is resting on the floor, are not recorded.

In one embodiment, if the weight of suitcase 22 as measured by sensor 82 is the same as, within a predetermined percentage of, or within a predetermined poundage of, another weight measurement in the recent past (e.g., the previous three hours), then any audio and/or video data stored in memory is erased or written over because the lack of change in the weight measurement indicates that nothing was permanently removed from suitcase 22 during the recorded inspection. Thus, the memory storage capacity associated with controller 88 may be reduced because any audio or video that was recorded very likely does not show any contents being stolen from suitcase 22. Thus, such audio and video may be erased or written over.

Figure 4:
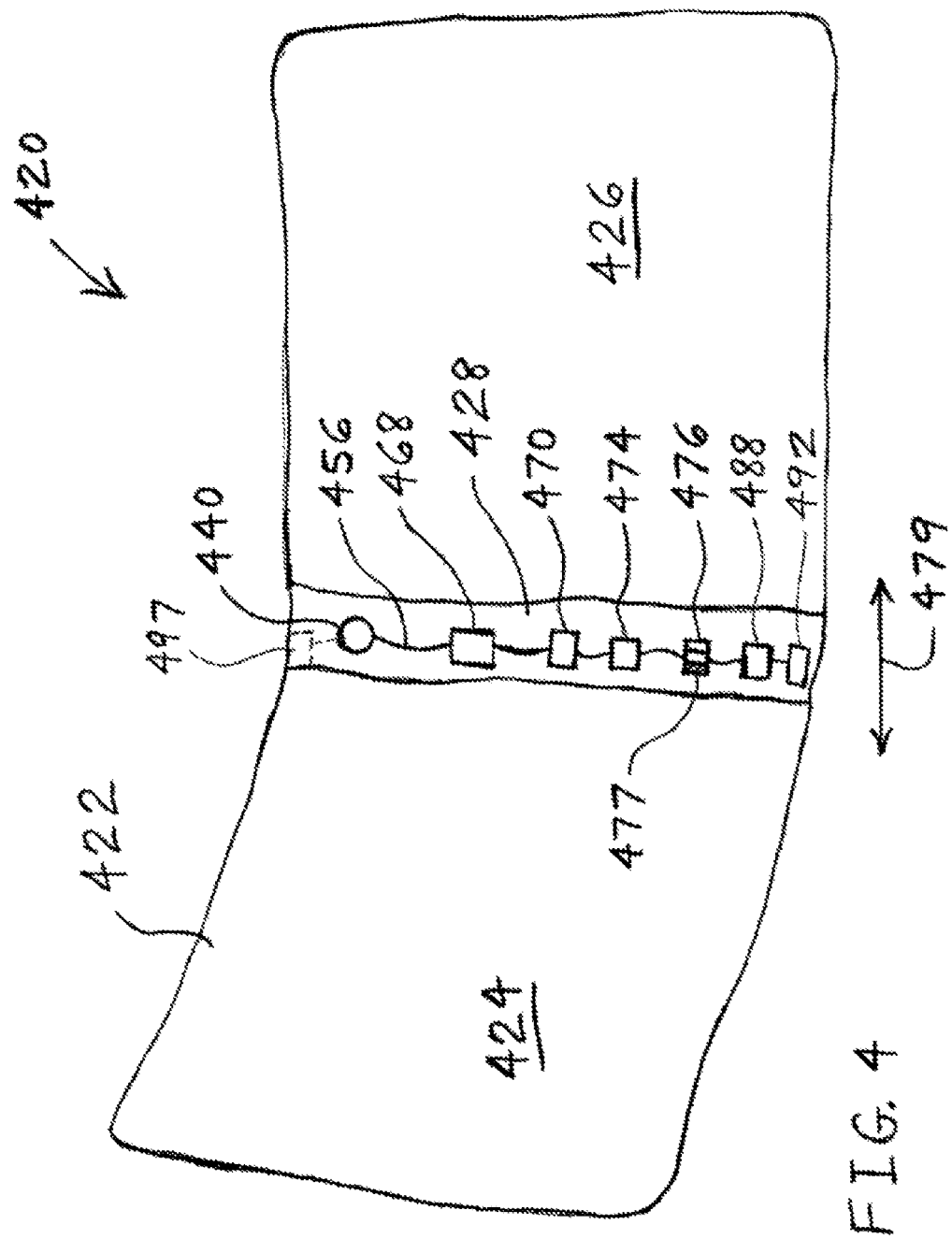
FIG. 4 is a perspective and schematic view of one embodiment of a personal container security system of the present invention.

One embodiment of a personal container security system 420 of the present invention is shown in FIG. 4. System 420 includes a wallet or billfold 422 having two foldable halves 424, 426 pivotally coupled to each other along a spine 428. Wallet 422 is shown in the open position in which foldable halves 424, 426 are splayed to expose a camera 440 mounted within the material of spine 428. Camera 440 may be a fisheye or wide angle lens camera. Camera 440 may be directed in a direction substantially perpendicular to spine 428 and generally towards the viewer of FIG. 4. Because of the wide angle field of view of camera 440, camera 440 may capture images of all of the activity in and around billfold 422. An electronic communication bus 456 may carry electrical power and commands to camera 440, and may carry digitized captured image data away from camera 440.

System 420 includes an open/closed switch sensor 468 mounted on spine 428 and in electrical communication with bus 456. When billfold 422 is open as shown in FIG. 4, switch sensor 468 is either open (e.g., internal contacts not touching) or closed (e.g., internal contacts touching). Conversely, when billfold 422 is closed, switch sensor 468 is in the other of the open and closed positions. That is, switch sensor 468 may be electrically closed when billfold 422 is closed, and electrically open when billfold 422 is open, or vice versa. Thus, switch sensor 468 may sense whether billfold 422 is in the open position or the closed position.

System 420 further includes other components that are interconnected via communication bus 456, including a battery 470 for powering all of the electrical devices connected to bus 456. Billfold 422 may include a touch sensor 474 for detecting when a human being touches billfold 422. In one embodiment, touch sensor 474 may be a capacitive touch sensor that measures a change in capacitance when a human being touches billfold 422. Because it is nearly certain that billfold 422 is moved somewhat whenever it is touched, touch sensor 474 may also function to detect motion of billfold 422.

Billfold 422 may include a manually-actuatable awake switch 476 that the user can actuate in order to place camera 440 into an awake mode in which camera 440 captures video data in response to switch sensor 468 determining that billfold 422 is in the open position. In one embodiment, switch 476 has three positions, including an awake mode position, a sleep mode position, and a neutral position. A selector 477 is manually slidable in directions indicated by double arrow 479 in order to select one of the three positions. In the awake mode position, system 420 remains in the awake mode so long as switch 476 remains in the awake mode position. Similarly, in the sleep mode position, system 420 remains in the sleep mode so long as switch 476 remains in the sleep mode position. In the neutral position, system 420 may switch to the awake mode from the sleep mode in response to certain predetermined stimuli. For example, a human touching billfold 422 as sensed by touch sensor 474, or it being sensed that the owner of billfold 422 is more than a predetermined distance from billfold 422, may at least temporarily cause system 420 to switch from the sleep mode to the awake mode.

In one specific embodiment, system 420 switches to the awake mode for a predetermined time period in response to the touching of billfold 422 being sensed, or in response to the owner of billfold 422 being more than a predetermined distance away from billfold 422 being sensed. After the predetermined time period, if no further touching of billfold 422 has been sensed, then system 420 reverts back to the sleep mode. This time period may be adjustable, wirelessly via a user interface on the owner's cell phone 90, for example, to a length of time in which it is likely that billfold 422 will be opened after having been found or stolen by someone other than the owner. In a specific embodiment, the predetermined time period is two minutes, but may range between about thirty seconds and about thirty minutes, for example.

When in the awake mode, camera 440 may record video image data in response to a determination that billfold 422 is in the open position. In one embodiment, the changing state of switch sensor 468 is indicative of billfold 422 being in the open position. Alternatively, camera 440 may operate as a light detector that determines that billfold 422 is in the open position when the presence of light is detected. Here again, in response to determining via light detection that billfold 422 is open, camera 440 may capture video data.

Billfold 422 may include an electronic controller 488 that is mounted on spine 428, that is electrically connected to bus 456, and that may be in communication with each of the above-described electrical devices via bus 456. Controller 488 may include a microprocessor and memory for storing video data. In one embodiment, controller 488 is able to switch camera 440 between an awake mode and a sleep mode. In the awake mode, the camera may be "ON" and running such that the camera captures a series of images in response to the determination that the billfold is in the open position. Sensor switch 468 may perform the detection of billfold 422 being in the open position. Alternatively, camera 440 may sense ambient light while still in the sleep mode to thereby perform the detection of billfold 422 being in the open position.

In the sleep mode, the camera does not capture images, but may consume less power from battery 470 in the sleep mode than in the awake mode. Accordingly, it may be extend battery life to keep camera 440 in the sleep mode unless there is reason to believe that there is potential for billfold 422 to be lost or stolen, and video recording may reveal the identity and/or location of the person who gains possession of billfold 422.

In one embodiment, controller 488 switches the camera from the sleep mode to the awake mode in response to there being an indication of some activity involving billfold 422, and thus there being some potential for billfold 422 becoming lost or stolen. Such an indication of activity may include the user actuating awake mode switch 476, camera 440 sensing motion of billfold 422, and/or touch sensor 474 detecting a human being touching billfold 422.

In one application, system 420 may be used to record the activities surrounding billfold 422 when it is opened if there is some reasonable possibility that billfold 422 is being opened by someone other than the owner of billfold 422. For example, while the user and his billfold are safe at home, system 420 may be maintained in a sleep mode such that the current draw from battery 470 is at a low level. However, when preparing for a public outing, the user may place switch 476 in the awake position such that it will record video upon being opened.

Alternatively, in embodiments in which the billfold, such as billfold 422, is equipped with touch sensing means, the user may place switch 476 in the neutral position just before going out in public. With switch 476 in this neutral position, the sensing of a human touching billfold 422 may cause system 420 to at least temporarily switch to the awake mode.

In the event that billfold 422 becomes lost or stolen, the person who gains possession of billfold 422 may unfold or open billfold 422 in order to see what is in it. If billfold 422 is in the neutral mode and is equipped with touch sensing means, the sensing of touching of billfold 422 may cause system 420 to go into the awake mode for three to thirty minutes, for example. With system 420 in the awake mode, due to switch 476 being in the awake mode position or due to the detection of touching, the person in possession of billfold 422 may open billfold 422 by pivoting foldable halves 424, 426 away from each other to the splayed position shown in FIG. 4. System 420 may sense that billfold 422 has been opened, such as by use of switch sensor 468, or by use of camera 440 in a light-sensing mode. In response to sensing that billfold 422 has been opened, camera 440 may begin to capture video image data. This captured video data may be transmitted to controller 488 for storage in memory associated with controller 488. Additionally, or alternatively, due to the substantial possibility that the owner of billfold 422 may not be able to re-gain possession of billfold 422 and its associated memory, the captured video data is transmitted to the owner's personal electronic device 90 by a radio frequency transceiver 492.

In one embodiment, upon sensing the opening of billfold 422, controller 488 and transceiver 492 transmit a wireless message, such as a text message, to the user's cell phone or other personal electronic device 90. Controller 488 then may transmit the streams of captured video data to the user for displaying and playing on personal electronic device 90. The user has the option of saving the received video data on device 90, or automatically saving the received video data on device 90 for later viewing without having to watch it live.

In one embodiment, personal electronics device 90 regularly (e.g., at twenty second intervals) transmits wireless, short-range signals to transceiver 492 in order to verify to controller 488 that the owner of billfold 422 is in possession and control of billfold 422, or at least is close enough to see billfold 422. The signals transmitted from device 90 to transceiver 492 may be receivable by transceiver 492 only when device 90 is within a predetermined distance of billfold 422, which in one embodiment may be approximately between ten and twenty feet. Controller 488 may listen for these RF signals from device 90 only when switch 476 is in the neutral or awake mode position. In the event that controller 488 stops receiving the signals from device 90, controller 488 may automatically transmit another RF signal to device 90, which may be in the form of a text message or similar, in order to inform the user, assuming that device 90 is on his person, that billfold 422 is more than the predetermined distance of ten to twenty feet away from him. Thereby, the owner is alerted to start looking around for billfold 422 before it gets too far away from him and before billfold 422 can no longer be recovered. In addition, or alternatively, in response to controller 488 no longer receiving the signals from device 90, controller 488 may switch system 420 into the awake mode such that system 420 captures and wirelessly transmits video data in response to sensing that billfold 422 has been unfolded (i.e., opened).

All of the electrical components of system 420 are shown as being visible in FIG. 4 for ease of illustration of the invention. However, it is to be understood that all of the electrical components of system 420 with the exception of camera 440 and user-actuatable switch 476 may be covered by the material (e.g., fabric, leather, etc.) of spine 428. Thus, these components are not visible to the user or to anyone else who picks up wallet 422.

Figure 5:
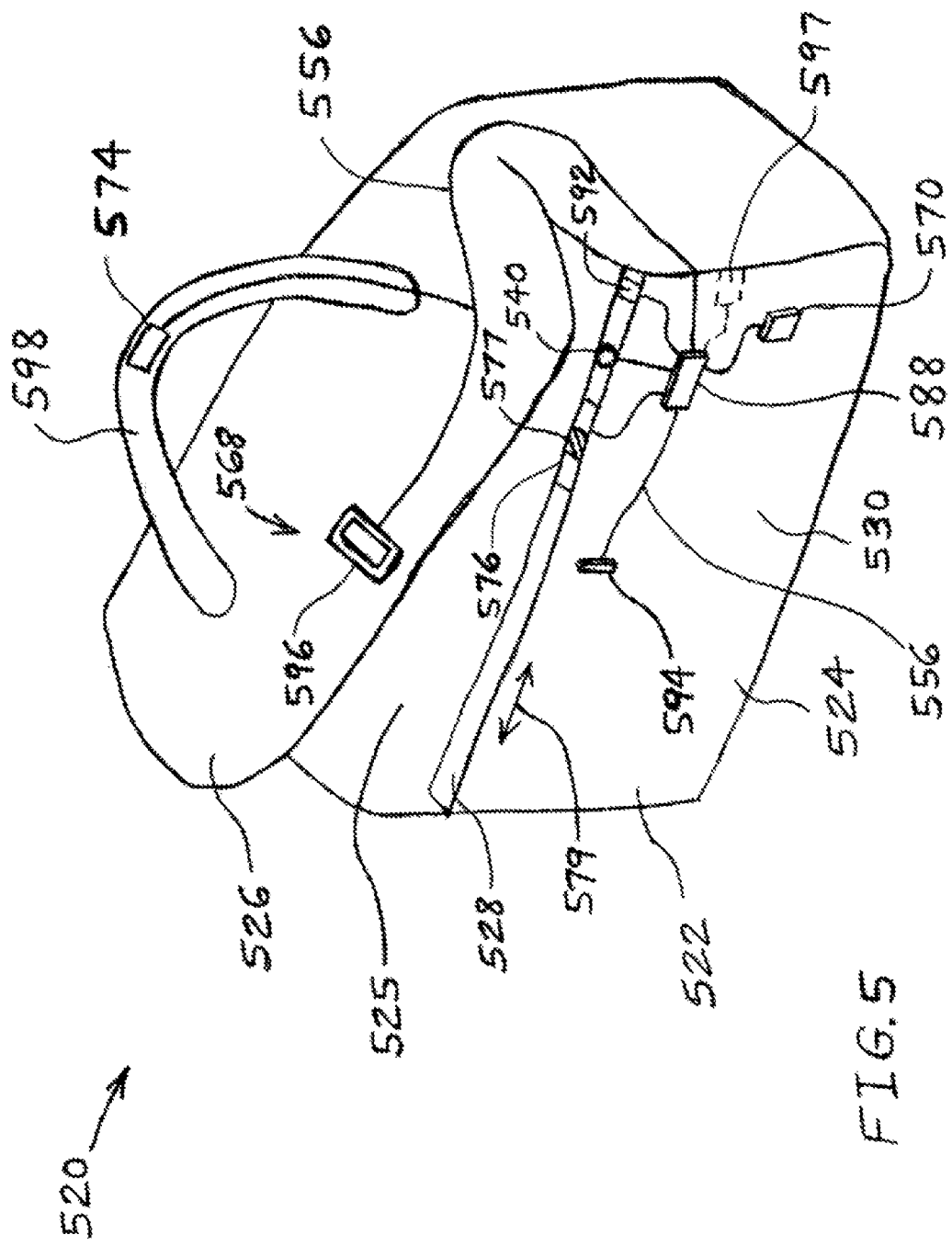
FIG. 5 is a perspective and schematic view of another embodiment of a personal container security system of the present invention.

Another embodiment of a personal container security system 520 of the present invention is shown in FIG. 5. System 520 includes a purse or handbag 522 having a body 524 and a cover or flap 526 such that a compartment 525 is defined between body 524 and flap 526 when flap 526 is covering body 524. Purse 522 is shown in a partially open position in which compartment 525 is partially exposed. A camera 540 is mounted on an upper edge 528 of a front wall 530 of body 524. Camera 540 is exposed to the ambient environment when compartment 525 is at least partially uncovered by flap 526. Camera 540 may be a fisheye or wide angle lens camera. Camera 540 may be directed in a direction substantially parallel to front wall 530 and perpendicular to upper edge 528. Because of the wide angle field of view of camera 540, camera 540 may capture images of all of the activity in and around purse 522. An electronic communication bus 556 may carry electrical power and commands to camera 540, and may carry digitized captured image data away from camera 540.

System 520 includes an open/closed sensor 568 having an electrically conductive rotatable clasp 594 mounted on front wall 530 and in electrical communication with one end of bus 556. Open/closed sensor 568 also has an electrically conductive buttonhole or eyelet 596 mounted on a front surface of flap 526 and in electrical communication with another end of bus 556. When purse 522 is open as shown in FIG. 5, clasp 594 is not in electrical contact with eyelet 596. In this open position, a controller 588 senses via bus 556 that clasp 594 is not electrically connected to eyelet 596 and hence that purse 522 is indeed open. Conversely, when purse 522 is closed, clasp 594 is received through eyelet 596, and clasp is rotated clockwise or counterclockwise ninety degrees from the vertical orientation shown in FIG. 5 to a horizontal orientation such that clasp 594 latches onto eyelet 596. In this closed position, controller 588 senses via bus 556 that clasp 594 is electrically connected to eyelet 596 and hence that purse 522 is indeed closed. Thus, sensor 568 may sense whether purse 522 is in the open position or the closed position.

System 520 further includes other components that are interconnected via communication bus 556, including a battery 570 for powering all of the electrical devices connected to bus 556. Purse 522 may include a touch sensor 574 for detecting when a human being touches a handle 598 of purse 522. In one embodiment, touch sensor 574 may be a capacitive touch sensor that measures a change in capacitance when a human being touches handle 598. Because it is nearly certain that purse 522 is moved somewhat whenever handle 598 is touched, touch sensor 574 may also function to detect motion of purse 522.

Purse 522 may include a manually-actuatable awake switch 576 that the user can actuate in order to place camera 540 into an awake mode in which camera 540 captures video data in response to switch sensor 568 determining that purse 522 is in the open position. In one embodiment, switch 576 has three positions, including an awake mode position, a sleep mode position, and a neutral position. A selector 577 is manually slidable in directions indicated by double arrow 579 in order to select one of the three positions. In the awake mode position, system 520 remains in the awake mode so long as switch 576 remains in the awake mode position. Similarly, in the sleep mode position, system 520 remains in the sleep mode so long as switch 576 remains in the sleep mode position. In the neutral position, system 520 may switch to the awake mode from the sleep mode in response to certain predetermined stimuli. For example, a human touching handle 598 as sensed by touch sensor 574, or it being sensed that the owner of purse 522 is more than a predetermined distance from purse 522, may at least temporarily cause system 520 to switch from the sleep mode to the awake mode.

In one specific embodiment, system 520 switches to the awake mode for a predetermined time period in response to the touching of handle 598 being sensed, or in response to the owner of purse 522 being more than a predetermined distance away from purse 522 being sensed. After the predetermined time period, if no further touching of purse 522 has been sensed, then system 520 reverts back to the sleep mode. This time period may be adjustable, wirelessly via a user interface on the owner's cell phone 90, for example, to a length of time in which it is likely that purse 522 will be opened after having been found or stolen by someone other than the owner. In a specific embodiment, the predetermined time period is two minutes, but may range between about thirty seconds and about thirty minutes, for example.

When in the awake mode, camera 540 may record video image data in response to a determination that purse 522 is in the open position. In one embodiment, the changing state of switch sensor 568 is indicative of purse 522 being in the open position. Alternatively, camera 540 may operate as a light detector that determines that purse 522 is in the open position when the presence of light is detected. Here again, in response to determining via light detection that purse 522 is open, camera 540 may capture video data.

Electronic controller 588 of purse 522 may be mounted in front wall 530, and may be in communication with each of the above-described electrical devices via bus 556. Controller 588 may include a microprocessor and memory for storing video data. In one embodiment, controller 588 is able to switch camera 540 between an awake mode and a sleep mode. In the awake mode, the camera may be "ON" and running such that the camera captures a series of images in response to the determination that the purse is in the open position. Sensor switch 568 may perform the detection of purse 522 being in the open position. Alternatively, camera 540 may sense ambient light while still in the sleep mode to thereby perform the detection of purse 522 being in the open position.

In the sleep mode, the camera does not capture images, but may consume less power from battery 570 in the sleep mode than in the awake mode. Accordingly, it may be extend battery life to keep camera 540 in the sleep mode unless there is reason to believe that there is potential for purse 522 to be lost or stolen, and video recording may reveal the identity and/or location of the person who gains possession of purse 522.

In one embodiment, controller 588 switches the camera from the sleep mode to the awake mode in response to there being an indication of some activity involving purse 522, and thus there being some potential for purse 522 becoming lost or stolen. Such an indication of activity may include the user actuating awake mode switch 576, camera 540 sensing motion of purse 522, and/or touch sensor 574 detecting a human being touching handle 598.

In one application, system 520 may be used to record the activities surrounding purse 522 when it is opened if there is some reasonable possibility that purse 522 is being opened by someone other than the owner of purse 522. For example, while the user and her purse are safe at home, system 520 may be maintained in a sleep mode such that the current draw from battery 570 is at a low level. However, when preparing for a public outing, the user may place switch 576 in the awake position such that it will record video upon being opened.

Alternatively, in embodiments in which the purse, such as purse 522, is equipped with touch sensing means, the user may place switch 576 in the neutral position just before going out in public. With switch 576 in this neutral position, the sensing of a human touching handle 598 may cause system 520 to at least temporarily switch to the awake mode.

In the event that purse 522 becomes lost or stolen, the person who gains possession of purse 522 may unfold or open purse 522 in order to see what is in it. If purse 522 is in the neutral mode and is equipped with touch sensing means, the sensing of touching of handle 598 may cause system 520 to go into the awake mode for three to thirty minutes, for example. With system 520 in the awake mode, due to switch 576 being in the awake mode position or due to the detection of touching, the person in possession of purse 522 may open purse 522 by rotating clasp 594 into a vertical orientation such that it is aligned with the throughhole of eyelet 596. Flap 526 may then be pulled away from front wall 530 to the position shown in FIG. 5, for example. System 520 may sense that purse 522 has been opened, such as by use of sensor 568, or by use of camera 540 in a light-sensing mode. In response to sensing that purse 522 has been opened, camera 540 may begin to capture video image data. This captured video data may be transmitted to controller 588 for storage in memory associated with controller 588. Additionally, or alternatively, due to the substantial possibility that the owner of purse 522 may not be able to re-gain possession of purse 522 and its associated memory, the captured video data is transmitted to the owner's personal electronic device 90 by a radio frequency transceiver 592.

In one embodiment, upon sensing the opening of purse 522, controller 588 and transceiver 592 transmit a wireless message, such as a text message, to the user's cell phone or other personal electronic device 90. Controller 588 then may transmit the streams of captured video data to the user for displaying and playing on personal electronic device 90. The user has the option of saving the received video data on device 90, or automatically saving the received video data on device 90 for later viewing without having to watch it live.

In one embodiment, personal electronics device 90 regularly (e.g., at twenty second intervals) transmits wireless, short-range signals to transceiver 592 in order to verify to controller 588 that the owner of purse 522 is in possession and control of purse 522, or at least is close enough to see purse 522. The signals transmitted from device 90 to transceiver 592 may be receivable by transceiver 592 only when device 90 is within a predetermined distance of purse 522, which in one embodiment may be approximately between ten and twenty feet. Controller 588 may listen for these RF signals from device 90 only when switch 576 is in the neutral or awake mode position. In the event that controller 588 stops receiving the signals from device 90, controller 588 may automatically transmit another RF signal to device 90, which may be in the form of a text message or similar, in order to inform the user, assuming that device 90 is on her person, that purse 522 is more than the predetermined distance of ten to twenty feet away from her. Thereby, the owner is alerted to start looking around for purse 522 before it gets too far away from her and before purse 522 can no longer be recovered. In addition, or alternatively, in response to controller 588 no longer receiving the signals from device 90, controller 588 may switch system 520 into the awake mode such that system 520 captures and wirelessly transmits video data in response to sensing that purse 522 has been opened.

All of the electrical components of system 520 are shown as being visible in FIG. 5 for ease of illustration of the invention. However, it is to be understood that all of the electrical components of system 520 with the exception of camera 540 and user-actuatable switch 576 may be covered by the material (e.g., fabric, leather, etc.) of body 524. Thus, these components are not visible to the user or to anyone else who picks up purse 522.

In the embodiments described above, it may be detected that the owner of the suitcase, billfold or purse is farther than a predetermined distance away from the suitcase, billfold or purse by noting that the suitcase, billfold or purse is no longer receiving regularly-transmitted signals from the owner's cell phone. However, in other embodiments, suitcase 22 may include an optional transponder 97 (FIG. 2a), billfold 422 may include an optional transponder 497, and/or purse 522 may include an optional transponder 597. Electronic device 90 transmits RF signals at regular intervals (e.g., every twenty seconds) to the transponder, and the transponder responds with a reply signal to device 90, thereby indicating that the transponder is still within transponder communication range (e.g., ten to twenty feet) of device 90. In the event that device 90 is no longer receiving such reply signals to its outgoing transponder signals, then device 90 may assume that the suitcase, billfold or purse is no longer within transponder communication range of device 90. Device 90 may then transmit another, longer-range RF signal to the suitcase, billfold or purse instructing the suitcase, billfold or purse to immediately enter the awake mode in which video data is captured in response to the suitcase, billfold or purse being opened.

In the embodiments described above, the camera may capture, record and/or transmit a stream of video images when in the awake mode and in response to the suitcase, billfold or purse being opened. In some embodiments, the camera is trained to recognize the owner's face via facial recognition techniques. As the camera captures image data in response to the suitcase, billfold or purse being opened, the facial recognition algorithm compares the image data to visual characteristics of the owner's face. If the owner's face is thus recognized in the captured image data, then the camera ceases the capturing of the image data, and any image data captured during that session may be erased or written over.

In the embodiments described above, the user may place the system in the awake mode by actuating a switch. In some other embodiments, the camera captures and stores the most recent few seconds of video data whenever the suitcase, billfold or purse is opened, but does not necessarily store more than the most recent few seconds of video data, and does not necessarily transmit the captured video data. In order to enable the user to cause the system to capture and store more than a few seconds of video data in response to subsequent openings of the suitcase, billfold or purse, and/or to wirelessly transmit the captured video data, the system may employ gesture recognition. For example, when the user opens the suitcase, billfold or purse and the camera begins to capture video data, the user may make some predetermined recognizable gesture in view of the camera, such as holding up two fingers. In response to recognizing the gesture, the system may then capture video data of indeterminate length, and/or may wirelessly transmit the captured video data, in response to subsequent openings of the suitcase, billfold or purse.

In further embodiments, gesture recognition may also be used to stop the system from recording more than a few seconds of video data, and from wirelessly transmitting the video data, in response to future openings of the suitcase, billfold or purse. For example, the user may make some recognizable gesture such as moving the tip of his finger in a circle, or holding up three fingers. According to pre-programming, the system may interpret the recognized gesture as a command to capture and store only the most recent few seconds of video data, and to not transmit the captured video data, in response to future openings of the suitcase, billfold or purse.

In some embodiments, device 90 automatically transmits the video and audio streams to a central storage location where the data can be seen and heard by police or other authorities. In the event that the suitcase, billfold or purse has been stolen, the centrally stored video and audio data may be used by police to identify the thief. The central processing location may automatically text message the owner of the container in response to receiving the video/audio data from device 90. If the user does not respond to the text message, the central processing location may call the telephone of device 90 and/or notify authorities to verify the safety and status of the owner of the container. In the event that the container owner has been mugged, abducted or attacked, he/she may be unable to respond to the text message and phone call from the central processing location. Police may then study the received video and audio data in order to determine what may have happened to the container owner, the identity of his assailant, and/or the location of the crime.

In some embodiments, the central processing location, upon determining that the owner of the container is not responding to attempts to contact him/her, and upon determining that the container may be of the type that contains one or more credit cards (e.g., wallet or purse), may electronically notify the credit card companies of the identity of the owner so that the credit card companies may immediately cancel the credit card so that a thief cannot buy anything with the card.

In one embodiment, the credit card itself has a transponder imbedded within it. The owner's electronic device 90 periodically (e.g., every five minutes) transmits an RF signal to the credit card transponder. If the credit card is out of transponder communication range (e.g., fifty to three hundred feet), then device 90 may automatically notify the central processing office that the credit card is missing. Device 90 may also ring, vibrate, buzz, and/or internally text message the owner in order to try to notify him that his credit card is beyond the transponder communication range. If the owner responds by moving device 90 within transponder communication range within a predetermined time period (e.g., five minutes), and/or by electronically indicating that he is still in control of the credit card, perhaps in conjunction with entering a password into device 90, then device 90 may again contact the central processing office and inform them that the credit card is secure. However, if the owner does not respond in this manner, then device 90 may do nothing and/or again notify the central processing office and inform them that the credit card is unsecure. In response to not receiving subsequent communication from device 90 after the initial warning message, and/or to receiving the confirmation warning message, the central processing office may electronically notify the credit card companies of the identity of the owner so that the credit card companies may immediately cancel the credit card so that a thief cannot buy anything with the card.

In any of the embodiments described above, the controller mounted on the container may be equipped with GPS global positioning capabilities or other means of determining the global coordinates of the container. The personal electronic device carried by the owner of the container may also be capable of determining its own global coordinates, such as via GPS, for example. Thus, the personal electronic device may periodically transmit an RF signal to the container informing the container of the current location of the owner. The controller in the container may use this location information associated with the owner in conjunction with the container's own global coordinates in order to determine whether the owner of the container is within a vicinity of the container. If the owner is outside the vicinity of the container, then the container may begin capturing images if the container also determines that the container is in the open position. In one embodiment, the container must also be in the awake mode in order to capture images.

In one embodiment, the container uses its global coordinate information to determine whether the container is away from the owner's home or place of work, or, in the case of luggage, is in or near a location where there is a high probability that the luggage may be separated from the owner and inspected, such as a transportation hub (e.g., airport, train station, bus station, etc.). The global coordinates of the owner's home or place of work may be programmed by the owner, or may be automatically determined by the container controller by analyzing historic global coordinate data (e.g., the most frequent and/or centralized location of the container). The global coordinates of various transportation hubs may be programmed during manufacture at the factory. If the container determines that it is in the open position, and that it is in or near a transportation hub, or at least away from the owner's home or place of work, then the camera(s) may begin capturing image data. The owner being outside a vicinity (or "out of range") of the container may or may not be another requirement for the camera to begin capturing image data. As in some other embodiments, the container may also need to be in the awake mode in order to begin capturing image data.

The container may also transmit its global coordinates to the owner's personal electronic device so that the owner can track the location of the container. This transmission of location data to the owner's personal electronic device may be in response to determining that the owner is out of the vicinity of the container; that the container is away from the owner's home or place of work; that the container is at a transportation hub; that the container has been opened; that an image of someone other than the owner has been captured by the camera; that the container is in an awake mode; and/or in response to an RF command from the owner's personal electronic device, for example.

The invention has been described above as being applied to personal containers such as suitcases, billfolds and purses. It is to be understood, however, that the invention may be applied to other containers, whether they be personal or nonpersonal. Nor is the invention applicable to only mobile containers. Rather, the invention may be used to monitor activity around fixed containers, such as cabinets, medicine cabinets, drawers, closets, pantries, refrigerators, safes, safe deposit boxes, and rooms of a personal residence, for example. The invention may further be applied to vehicle passenger compartments, vehicle trunks, glove boxes, briefcases, jewelry boxes, and mobile safes, for example.

The camera or cameras may have been described herein as being hidden from view. However, in other embodiments, the camera(s) may be prominently displayed or in plain view in order to make the person aware that he is being monitored by the camera(s). Thus, theft from the container, or of the container itself, may be discouraged.

While this invention has been described as having an exemplary design, the present invention may be further modified within the spirit and scope of this disclosure. This application is therefore intended to cover any variations, uses, or adaptations of the invention using its general principles.

What is claimed is:

1. A personal container security system, comprising:
  a personal container having an open position and a closed position;
  means for sensing absence of a human owner of the container within a vicinity of the container;
  a detector configured to detect that the container is in the open position;
  a camera mounted to the container, the camera being communicatively coupled to the detector, the camera having:
    an awake mode in which the camera captures a plurality of images in response to:
      the the detector detecting that the container is in the open position; and
      the sensing means sensing an absence of the human owner of the container within a vicinity of the container; and
    a sleep mode in which the camera does not capture images;
  an awake mode switch; and,
  a controller mounted within the interior of the personal container and communicatively coupled to the camera, the controller configured to switch the camera from the sleep mode to the awake mode in response to
    the user actuating the awake mode switch to place the switch in a neutral position, and at least one from the group of
      a motion detector mounted to the suitcase detecting motion of the suitcase; and
      a touch sensor mounted to the suitcase detecting a human being touching the suitcase.

2. The system of claim 1 wherein the container comprises a suitcase, a billfold or a purse.

3. The system of claim 1 wherein the container includes a radio frequency transponder, the sensing means comprising a personal electronic device configured to transmit a plurality of radio frequency signals to the transponder, the transponder being configured to wirelessly respond to the radio frequency signals from the personal electronic device only if the human owner is within the vicinity of the container.

4. The system of claim 1 further comprising an electronic controller communicatively coupled to each of the sensing means, the detecting means, and the camera, wherein the sensing means comprises a facial recognition algorithm run by the controller on the images captured by the camera.

5. The system of claim 1 wherein the system includes the awake mode switch, the awake mode switch further having a sleep mode position and an awake mode position, the controller being configured to:
  when the awake mode switch is in the sleep position, maintain the camera in the sleep mode; and,
  when the awake mode switch is in the awake position, maintain the camera in the awake mode.

6. A luggage security system, comprising:
  a suitcase including a first shell half having a first proximal end and a first distal end, and a second shell half having a second proximal end and a second distal end, the first proximal end and the second proximal end being attached together by a hinge, the suitcase having an open position in which the distal ends are pivoted about the hinge away from each other, and a closed position in which the distal ends are adjacent to each other;
  a detector configured to detect that the suitcase is in the open position;
  a motion detector configured to detect motion of the suitcase;
  a first camera mounted to the first distal end of the suitcase;
  a second camera mounted to the second distal end of the suitcase, each of the first and second cameras being directed generally towards an interior of the suitcase when the suitcase is in the open position; electrical power means for powering the first and second cameras, wherein each of the first and second cameras has:
    an awake mode in which the camera captures a plurality of images in response to the detecting means detecting the suitcase being in the open position; and
    a sleep mode in which the camera does not capture images, the camera being configured to consume less power from the electrical power means in the sleep mode than in the awake mode; and,
  a controller electrically connected to the open position detector, each of the cameras, the electrical power means, the motion detector, and an awake mode switch, the controller being configured to:
    when the awake mode switch is in a neutral position, switch the cameras from the sleep mode to the awake mode in response to the motion detector detecting motion of the suitcase.

7. The system of claim 6 wherein the first camera comprises a pan, tilt, zoom camera, the second camera comprising a wide angle lens camera, the first camera being enclosed in a tinted hemispherical dome, the system further comprising means for transmitting the images captured by the first camera to a personal electronics device, the first camera being configured to perform panning movements, tilting movements, and/or zooming movements in response to commands wirelessly transmitted from the personal electronics device.

8. The system of claim 6 further comprising a controller communicatively coupled to each of the first and second cameras and configured to switch the cameras from the sleep mode to the awake mode in response to at least one of:
  the user actuating an awake mode switch;
  a motion detector mounted to the suitcase detecting motion of the suitcase; and
  a touch sensor mounted to the suitcase detecting a human being touching the suitcase.

9. The system of claim 6, wherein the awake mode switch further comprises a sleep mode position and an awake mode position, and wherein the controller is further configured to:
  when the awake mode switch is in the sleep position, maintain the camera in the sleep mode; and, when the awake mode switch is in the awake position, maintain the camera in the awake mode.

10. The system of claim 6 further comprising a radio frequency transmitter configured to transmit the images captured by the first and second cameras to an external electronic device.

* * * * *